United States Patent

Surowiec et al.

[11] Patent Number: 5,804,606
[45] Date of Patent: Sep. 8, 1998

[54] CHELATING RESINS

[75] Inventors: Joanna Surowiec; Jaques Franc, both of Chauny; Jeannot Lucien Hawecker, Lauterbourg, all of France

[73] Assignee: Rohm & Haas Company, Phila., Pa.

[21] Appl. No.: 844,740

[22] Filed: Apr. 21, 1997

[51] Int. Cl.⁶ .............................. B01J 39/18; C02F 1/42; C02F 1/58; C02F 1/62

[52] U.S. Cl. ............................ 521/32; 210/681; 210/687; 210/688; 521/30; 521/31; 521/33; 521/39; 525/340; 525/379

[58] Field of Search .................................. 521/32, 30, 39, 521/31; 210/681, 687, 688

[56] References Cited

U.S. PATENT DOCUMENTS

| | | | |
|---|---|---|---|
| 4,002,564 | 1/1977 | Carbonel et al. | 210/38 |
| 4,442,231 | 4/1984 | Kataoka et al. | 521/32 |
| 4,818,773 | 4/1989 | Cornette et al. | 521/32 |
| 4,830,837 | 5/1989 | Justice | 423/181 |
| 4,895,905 | 1/1990 | Schneider et al. | 525/154 |
| 5,109,074 | 4/1992 | Eiffler et al. | 525/340 |

*Primary Examiner*—Fred Zitomer
*Attorney, Agent, or Firm*—Ronald S. Hermenau

[57] ABSTRACT

The present invention is concerned with improved chelating resins. More particularly, the present invention is concerned with macroporous, aminoalkylphosphonic or iminodiacetic acid chelating resins having improved stability and capacity in the removal of cations (e.g. calcium, magnesium, barium and strontium) from brines and in the removal of metals (e.g. nickel, copper and zinc) from waste streams.

16 Claims, No Drawings

CHELATING RESINS

The present invention is concerned with improved chelating resins. More particularly, the present invention is concerned with macroporous, chelating resins having improved stability and capacity in the removal of cations (e.g. calcium, magnesium, barium and strontium) from brines and in the removal of metals (e.g. nickel, copper, antimony and zinc) from waste streams.

The modern production of chlorine gas and metal hydroxides relies on the electrolysis of brine (NaCl) solutions using membrane chloroalkali cells. In the membrane chloroalkali cells, the membrane prevents the mixing of caustic (NaOH) and hydrogen with brine and chlorine by letting only water and sodium ions (cations) through. These membranes are very robust but can be damaged by the precipitation of hard ions such as calcium, magnesium, strontium and barium. Thus, the performance and lifetime of these membranes is directly related to the amount of hard ion impurities present. In order to reduce the levels of hard ions to the desired level of less than 20 ppb, selective chelating ion exchange resins have been developed. In particular, ion exchange resins containing either aminoalkylphosphonic acid groups or aminodiacetic acid groups have been found to be effective at reducing the level of hard ions in brine to lower than 20 ppb. When the ion exchange resin becomes exhausted with the hard ions, they can easily be regenerated with caustic.

Also, the discharge of heavy metals from various plating and manufacturing industries continues to be an environmental concern. Often the removal of these metals from waste streams is complicated due to the presence of other benign metal ions (e.g. sodium or calcium) which pose no environmental threat. The removal of all metal ions would be uneconomical and thus resins which selectively remove heavy metal ions in the presence of other ions have been developed. Iminodiacetic acid resins and aminoalkylphosphonic resins represent this type of heavy metal selective resin.

Aminoalkylphosphonic acid resins used in brine purification should have a large capacity to selectively remove calcium and magnesium ions from concentrated brine. Additionally, such resins should have a high resistance to osmotic shock so that breakdown in the concentrated brines and caustic, such as the concentrated brines and caustic that occurs in chloroalkali cells, does not occur. In addition to removing hard ions such as calcium and magnesium, the resin should also be able to remove the strontium and barium ions which are more difficult to remove from concentrated brine. Since the selectivity for strontium and barium is not as high as calcium and magnesium, these ions are released first when the resins become exhausted. The presence of elevated levels of strontium in the effluent can be used as a sign that breakthrough is imminent and regeneration should be performed. Thus a resin with good capacity for both strontium and calcium is necessary.

The development of macroreticular or macroporous aminoalkylphosphonic acid resins for use in brine softening has been described in U.S. Pat. No. 4,002,564 and U.S. Pat. No. 4,818,773. In U.S. Pat. No. 4,002,564 the synthesis of macroporous aminoalkylphosphonic resins from the functionalization of macroporous styrene/divinylbenzene copolymers is described. These resins were found to have good capacity for removing metal ions. In U.S. Pat. No. 4,818,773 macroporous aminoalkylphosphonic resins having a porosity of 0.80–1.10 cm$^3$/g, an apparent density of 0.354–0.425 g/ml and a water retention of 50–60 percent (%) in the acid form are described as having a high resistance to osmotic shock (greater than 90% intact beads after 30 shocks) and an adequate exchange capacity (theoretical capacity of calcium ions not greater than 31 g/ml) for use in the purification of concentrated brines.

A process for preparing aminoalkylphosphonic acid resins in one step without the addition of formaldehyde is described in U.S. Pat. No. 5,109,074. An alternative process for producing aminoalkylphosphonic acid resins for use in brine purification is reported in U.S. Pat. No. 4,442,231.

Gel type aminoalkylphosphonic and iminodiacetic acid chelating resins in which a core/shell morphology is used is described in U.S. Pat. No. 4,895,905.

We have now found that certain macroporous copolymers, produced by the suspension polymerization of monovinyl aromatics, divinylaromatics and oxygen containing crosslinkers in the presence of a phase extender, and which are functionalized with aminoalkylphosphonic acid or iminodiacetic acid groups, have been found to exhibit improved stability and capacity in (i) the removal of cations such as calcium, magnesium, strontium and barium from brines, for example brines used in chloroalkali cells, and (ii) the removal of metals such as nickel, copper, antimony and zinc from waste streams.

According to the present invention there is provided a macroporous, chelating ion exchange resin, which comprises a copolymer comprising (i) 86 to 94 percent (%) by weight of units derived from monovinyl aromatic monomer such as styrene, vinyltoluene or vinylethylbenzene, preferably styrene, (ii) 4 to 8% by weight of units derived from divinyl aromatic monomer such as divinylbenzene or divinylnaphthalene, preferably divinylbenzene, and (iii) 2 to 6% by weight of units derived from oxygen-containing crosslinker monomer such as trimethylolpropanetrimethacrylate, diethyleneglycoldimethacrylate or diethyleneglycoldivinylether, preferably trimethylolpropanetrimethacrylate (TMPTMA), and wherein the copolymer is functionalized with aminoalkylphosphonic or iminodiacetic acid groups.

Preferably, the divinyl aromatic monomer is present in the copolymer in an amount of about 6% by weight, based on the weight of the copolymer.

Preferably, the oxygen-containing crosslinker monomer is present in the copolymer in an amount of about 4% by weight, based on the weight of the copolymer.

According to the present invention there is also provided a method for preparing a macroporous, chelating ion exchange resin, which comprises (I) suspension polymerizing a monomer mixture comprising (i) 86 to 94% by weight of monovinyl aromatic monomer such as styrene, vinyltoluene or vinylethylbenzene, preferably styrene, (ii) 4 to 8% by weight of divinyl aromatic monomer such as divinylbenzene or divinylnaphthalene, preferably divinylbenzene, and (iii) 2 to 6% by weight of oxygen-containing crosslinker monomer such as trimethylolpropanetrimethacrylate, diethyleneglycoldimethacrylate or diethyleneglycoldivinylether, preferably trimethylolpropanetrimethacrylate, the percentages of monomers being based on the weight of the monomer mixture, and the polymerization being carried out in the presence of 40 to 48% by weight of a phase extender such as methylisobutylcarbinol (MIBC—also known as 4-methyl-2-pentanol), the percentage of phase extender being based on the total weight of the phase extender and monomer mixture, and (II) functionalizing the resulting copolymer with aminoalkylphosphonic or iminodiacetic acid groups.

Preferably, in the method for preparing the chelating resin, the divinyl aromatic monomer is present in an amount of about 6% by weight, based on the weight of the monomer mixture.

Preferably, in the method for preparing the chelating resin, the oxygen-containing crosslinker monomer is present in an amount of about 4% by weight, based on the weight of the monomer mixture.

Preferably, the phase extender is used in an amount of from 40 to 44% by weight based on the total weight of the phase extender and monomer mixture.

The suspension polymerization is carried out in the presence of a polymerization initiator, such as benzoyl peroxide or tertiary butylperoctoate, which is soluble in the organic phase containing the monomer mixture and phase extender.

We have found that the use, in preparing the chelating resins according to the present invention, of oxygen-containing crosslinker, preferably trimethylolpropanetrimethacrylate (2–6% by weight, preferably about 4% by weight) in addition to divinyl aromatic monomer, preferably divinylbenzene (4–8% by weight, preferably about 6% by weight) and at a 40–48% phase extender, preferably methylisobutylcarbinol, level increases both the physical stability and operating capacity of the final functionalized resin. Although not fully understood, it is believed that the use of oxygen-containing crosslinkers such as trimethylpropanetrimethacrylate change the structure and/or the hydrophilic nature of the resin to give a much higher operating capacity as compared to resin prepared without oxygen-containing crosslinker.

The resins produced according to the method of the present invention do not have the porosity characteristics and are more osmotically stable than the aminoalkylphosphonic acid resins described in U.S. Pat. No. 4,818,564. The resins produced according to the present invention also out perform the resins described in U.S. Pat. No. 4,002,564. The operating performance of the resins produced according to the present invention is equal to or higher than that of other resins which have greater degrees of functionalization. Even more surprisingly, the resins produced according to the present invention have been found to have higher capacity/selectivity for strontium compared to other aminoalkylphosphonic resins.

It is believed that, by manipulating the structure of the polymer morphology through the use of certain crosslinkers/crosslinker levels and a specific phase extender level, copolymers are produced which, when functionalized to contain aminoalkylphosphonic or iminodiacetic acid chelating ligands (i.e. to produce resins according to the present invention), show improved properties. This improvement in properties, as evidenced by the fact that chelating resins which have higher degrees of functional groups are not as effective as the resins of the present invention, is believed to be the result of optimized polymer morphology.

We have found that through the optimization of (a) the choice of, and amount of, crosslinkers, and (b) the amount of phase extender, chelating resins can be produced that out perform resins with higher degrees of functionalization, and that have improved stability.

According to the present invention there is further provided a method for removing cations, for example one or more ions selected from the group consisting of calcium, magnesium, strontium and barium ions, from brine solutions, which comprises contacting the brine solution with a macroporous, chelating ion exchange resin according to the present invention or with a macroporous, chelating ion exchange resin prepared by the method according to the present invention.

According to the present invention there is still further provided a method for removing metal ions, for example heavy metal ions such as one or more ions selected from the group consisting of nickel, copper, antimony and zinc ions, from waste streams, which comprises contacting the waste stream with a macroporous, chelating ion exchange resin according to the present invention or with a macroporous, chelating ion exchange resin prepared by the method according to the present invention.

Some embodiments of the present invention will now be described in detail in the following Examples.

Example 2 is an aminomethylphosphonic acid resin, according to the present invention, produced from the chloromethylation, amination, hydrolysis and methylphosphonation of a macroporous copolymer produced by the polymerization of styrene, divinylbenzene and trimethylolpropanetrimethacrylate in the presence of the phase extender MIBC (4-Methyl 2-pentanol).

Example 3 is an iminodiacetic acid resin, according to the present invention, produced by chloromethylating then aminating, hydrolyzing and reacting with chloroacetic acid, a macroporous copolymer produced by the polymerization of styrene, divinylbenzene and trimethylolpropanetrimethacrylate in the presence of the phase extender MIBC (4-Methyl 2-pentanol).

Resin A is an Aminomethylphosphonic acid resin commercially available from Bayer.

Resin C is an Iminodiacetic acid resin commercially available from Bayer.

Resin D is an Iminodiacetic acid resin available from Rohm and Haas Company.

Resin B is an Aminomethylphosphonic acid resin produced as described in U.S. Pat. No. 4,002,564.

EXAMPLE 1

Synthesis of Copolymer

To a 2-liter, 4-necked flask equipped with a condenser, mechanical stirrer, thermocouple and nitrogen inlet containing an aqueous solution made up of 700 g of D.I. water, 4.9 g of gelatin, 17.3 g of polyallyldimethylammonium chloride, 1.1 g of 50% sodium hydroxide and 1.8 g of boric acid was added a monomer mixture containing 370 g of styrene, 40.7 g of 63% DVB, 17.1 g of trimethylolpropanetrimethylacrylate, 310 g of MIBC and 4.3g of t-butylperoctoate. Under a nitrogen atmosphere, this mixture was stirred to maintain the correct particle size (200–500 microns) and heated to 80° C. over a 1 hour period. The reaction was then allowed to polymerize at 80° C. for 9 hours. The MIBC was removed from the resulting polymer beads by distillation. After the MIBC was removed the beads were allowed to dry overnight in an oven at 40° C.

EXAMPLE 2

Synthesis of Aminomethylphosphonic acid resin according to the present invention.

The resulting porous polymer beads from Example 1 were chloromethylated by reacting 100 g of polymer beads with a solution containing 278 g of chlorosulfonic acid, 118 g of formaldehyde, 75 g of methanol, and 17.5 g of hydrated ferric chloride as the catalyst. This mixture was heated to 35° C. with stirring and held for 6 hours. After 6 hours, the reaction was cooled to room temperature and water was added. The beads were then washed using dilute caustic. The resulting bead slurry was then transferred to a reactor containing 300 ml of methylal. After 1 hour of stirring, 190 g of hexamethylenetetraamine in 150g of water was added. This mixture was then heated to 45° C. and allowed to reflux for 4 hours. After refluxing, the aqueous was siphoned and the resulting aminated intermediate was washed with water. The hydrolysis of the resulting aminated intermediate was accomplished using 500 g of 18% HCl at 45° C. for 3 hours. After washing this product, 250 ml of intermediate was removed and placed into a reactor. To this reactor was added 125 g of aqueous 37% formaldehyde, followed by 150 g of phosphorous acid and 100 g of aqueous 35% HCl. This mixture was heated to 90° C. and held for 8 hours. The resulting material was washed with generous amounts of water and methanol and then neutralized with 10% NaOH.

EXAMPLE 3
Synthesis of Iminodiacetic acid resin according to the present invention.

The porous copolymer from Example 1 was chloromethylated by reacting 100 g of polymer beads with a solution containing 278 g of chlorosulfonic acid, 118 g of formaldehyde, 75 g of methanol, and 17.5 g of hydrated ferric chloride as the catalyst. This mixture was heated to 35° C. with stirring and held for 6 hours. After 6 hours, the reaction was cooled to room temperature and water was added. The beads were then washed using dilute caustic. The resulting bead slurry was then transferred to a reactor containing 300 ml of methylal. After 1 hour of stirring, 190 g of hexamethylenetetraamine in 150 g of water was added. This mixture was then heated to 45° C. and allowed to reflux for 4 hours. After refluxing, the aqueous was siphoned and the resulting aminated intermediate was washed with methanol. The hydrolysis of the resulting aminated intermediate was accomplished using 250 g of 37% HCl in 150 g of methanol at 45° C. for 3 hours. After washing this product, 250 ml of intermediate was removed and placed into a reactor. To this reactor was added 300 g of 35% NaOH and then 300 g of aqueous sodium chloroacetate. After addition the temperature was increased to 90° C. and the reaction was held for 5 hours. The resulting resin was washed with generous amounts of water.

TABLE 1

Properties of Chelating Resins

| Sample | Example 2 | Resin A | Resin B | Example 3 | Resin C | Resin D |
|---|---|---|---|---|---|---|
| Type | amino-methyl phosphonic acid | amino-methyl phosphonic acid | amino-methyl phosphonic acid | imino-diacetic acid | imino-diacetic acid | imino-diacetic acid |
| Properties | | | | | | |
| MHC (Na)* | 63.0% | 53.8% | 67.5% | 61.1% | 57.2% | 68.0% |
| Solids** | 37.0% | 46.2% | 32.5% | 38.9% | 42.8% | 32.0% |
| Vol. Cap. (Na) | 1.5 meq/ml | 1.7 meq/ml | 1.2 meq/ml | 1.4 meq/ml | 2.0 meq/ml | 1.0 meq/ml |
| Wt. Cap. (H) | 6.0 meq/g | 5.5 meq/g | 5.6 meq/g | 5.2 meq/g | 6.4 meq/g | 4.9 meq/g |
| Acid/base cycling broken beads 90 cycles | 2% | 5% | 3% | 2% | not measured | 4% |
| Porosimetry | | | | | | |
| Surface area | 26.6 m2/g | | | | | |
| Porosity | | | | | | |
| Total | 0.18 cc/g | | | | | |
| Micro (t-plot) | 0.01 cc/g | | | | | |
| Meso | 0.04 cc/g | | | | | |
| Macro | 0.13 cc/g | | | | | |

Resin A, C and D represent commercially available chelating resins. Resin B is produced as described in US-A-4,002,564. Resin A, B, C, D are not the subject of this present invention and are used for comparative purposes only.
*MHC(Na) is the percentage of moisture in the sodium form.
**Solids is 100% - MHC.
Acid/Base cycling - a test of stability to osmotic changes - 10 g of resin is treated with 1.3 N $H_2SO_4$, water washed, treated with 3.5 N NaOH and water washed. This represents one cycle and the % broken beads are determined optically using a microscope.
Porosimetry was conducted using a Micromeretics ASAP-2400 nitrogen Porosimeter
Porosity is reported using the following IUPAC nomenclature:
Microporosity = pores <20 Angstroms
Mesoporosity = pores between 20 and 500 Angstroms
Macroporosity = pores >500 Angstroms The following Examples illustrate the use of the resins for ion removal. The conditions used for these examples are representative of conditions experienced in actual industrial situations and illustrate actual operating capacities.

EXAMPLE 4
Brine Purification using Aminoalkylphosphonic Acid Resins

An aqueous brine solution (300 g NaCl /l at a pH of 10.5) containing 5 ppm of Ca and 2 ppm of Sr at 60° C. is passed through a column of aminomethylphosphonic acid resin at a rate of 20 bed volumes per hour (BV/hr). The amount of Ca and Sr in the effluent is measured by an Atomic Adsorption Spectrophotometer.

| Chelating Resin | BV to 500 ppb Sr level | BV to 50 ppb Ca level |
|---|---|---|
| Resin A | 800 | 950 |
| Resin B | 600 | 900 |
| Example 2 | 1000 | 1100 |

EXAMPLE 5
Brine Purification using Iminodiacetic Acid Resins

An aqueous brine solution (300 g NaCl /l at a pH of 10.5) containing 5 ppm of Ca and 2 ppm of Sr at 60° C. is passed through a column of iminodiacetic acid resin at a rate of 20 bed volumes per hour. The amount Sr in the effluent is measured by an Atomic Adsorption Spectrophotometer.

| Chelating Resin | BV to 500 ppb Sr level |
| --- | --- |
| Resin D | 650 |
| Resin C | 1000 |
| Example 3 | 900 |

EXAMPLE 6
Metals Removal using Iminodiacetic Acid Resins

An aqueous salt (1 g NaCl/l, 1 g $CaCl_2$/l) waste steam containing 5 ppm of Zn, 5 ppm of Ni, and 2 ppm of Cu at a pH of 7 is passed through a column of the iminodiacetic acid resin at a rate of 20 bed volumes per hour. The amount of heavy metals present in the effluent is measured by Atomic Adsorption.

| Chelating Resin | BV to 1 ppm Zn level | BV to 0.5 ppm Ni level |
| --- | --- | --- |
| Resin D | 800 | 1000 |
| Resin C | 1200 | 1600 |
| Example 3 | 1200 | 1600 |

We claim:

1. A macroporous, chelating ion exchange resin, which comprises a copolymer comprising 86 to 94 percent by weight of units of monovinyl aromatic monomer, 4 to 8 percent by weight of units of divinyl aromatic monomer and 2 to 6 percent by weight of units of oxygen-containing crosslinker, and wherein the copolymer is functionalized with aminoalkylphosphonic or iminodiacetic acid groups, wherein the copolymer is prepared by polymerization of a monomer mixture in the presence of 40 to 48 percent by weight of phase extender, the percent of phase extender being based on total weight of phase extender and monomer mixture used in the polymerization.

2. A macroporous resin as claimed in claim 1, wherein the units of the divinyl aromatic monomer are units of divinylbenzene and are present in the copolymer in an amount of about 6 percent by weight, based on the weight of the copolymer.

3. A macroporous resin as claimed in claim 1, wherein the units of the oxygen-containing monomer are units of trimethylolpropanetrimethacrylate and are present in the copolymer in an amount of about 4 percent by weight, based on the weight of copolymer.

4. A macroporous resin as claimed in claim 2, wherein the units of the oxygen-containing monomer are units of trimethylolpropanetrimethacrylate and are present in the copolymer in an amount of about 4 percent by weight, based on the weight of copolymer.

5. A method for preparing a macroporous, chelating ion exchange resin, which comprises (i) suspension polymerizing a monomer mixture comprising 86 to 94 percent by weight of monovinyl aromatic monomer, 4 to 8 percent by weight of divinyl aromatic monomer and 2 to 6 percent by weight of oxygen-containing crosslinker monomer, the percentages of monomers being based on the weight of the monomer mixture, and the polymerization being carried out in the presence of 40 to 48 percent by weight of phase extender, the percentage of phase extender being based on the total weight of the phase extender and monomer mixture, and (ii) functionalizing the resulting copolymer with aminoalkylphosphonic or iminodiacetic acid groups.

6. A method as claimed in claim 5, wherein the divinyl aromatic monomer is divinylbenzene and is present in an amount of about 6 percent by weight, based on the weight of the monomer mixture.

7. A method as claimed in claim 5, wherein the oxygen-containing crosslinker monomer is trimethylolpropanetrimethacrylate and is present in an amount of about 4 percent by weight, based on the weight of the monomer mixture.

8. A method as claimed in claim 6, wherein the oxygen-containing crosslinker monomer is trimethylolpropanetrimethacrylate and is present in an amount of about 4 percent by weight, based on the weight of the monomer mixture.

9. A method for removing cations from brine solutions, which comprises contacting the brine solution with a macroporous, chelating ion exchange resin as claimed in claim 1, 2, 3 or 4.

10. A method for removing cations from brine solutions, which comprises contacting the brine solution with a macroporous chelating ion exchange resin prepared by a method as claimed in claim 5, 6, 7 or 8.

11. A method as claimed in claim 9, wherein one or more ions selected from the group consisting of calcium, magnesium, strontium and barium ions are removed from the brine solution.

12. A method as claimed in claim 10, wherein one or more ions selected from the group consisting of calcium, magnesium, strontium and barium ions are removed from the brine solution.

13. A method for removing metal ions from waste streams, which comprises contacting the waste stream with a macroporous, chelating ion exchange resin as claimed in claim 1, 2, 3 or 4.

14. A method for removing metal ions from waste streams, which comprises contacting the waste stream with a macroporous chelating ion exchange resin prepared by a method as claimed in claim 5, 6, 7, or 8.

15. A method as claimed in claim 13, wherein one or more ions selected from the group consisting of nickel, copper, antimony and zinc ions are removed from the waste streams.

16. A method as claimed in claim 14, wherein one or more ions selected from the group consisting of nickel, copper, antimony and zinc ions are removed from the waste streams.

* * * * *